June 22, 1937.   T. E. HAUGHT   2,084,955
FLUID STRAINER
Filed Aug. 6, 1935   3 Sheets-Sheet 1

Thomas E. Haught, INVENTOR
BY Victor J. Evans & Co.
ATTORNEY

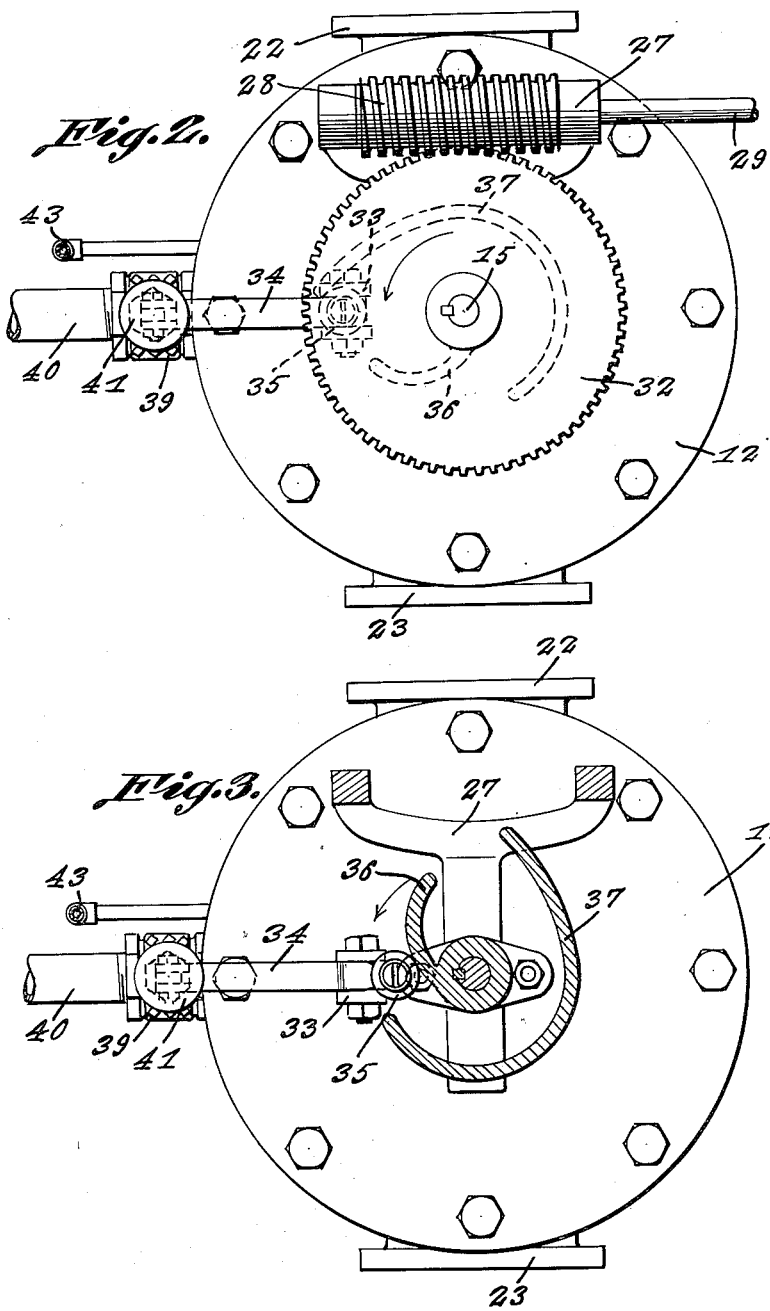

June 22, 1937.  T. E. HAUGHT  2,084,955
FLUID STRAINER
Filed Aug. 6, 1935  3 Sheets-Sheet 3

Thomas E. Haught, INVENTOR
BY Victor J. Evans & Co.
ATTORNEY

Patented June 22, 1937

2,084,955

UNITED STATES PATENT OFFICE 2,084,955

FLUID STRAINER

Thomas E. Haught, Boldman, Ky.

Application August 6, 1935, Serial No. 35,011

1 Claim. (Cl. 210—167)

The invention relates to a strainer and more especially to an automatic adjustable fluid strainer.

The primary object of the invention is the provision of a device of this character, wherein the same is placed in a feed conduit, pipe or the like so that all debris such as leaves or other matter will be caught and the fluid strained, the debris and other matter as collected to avoid carriage thereof by the fluid will be expelled from the flowing fluid, there being no liability of the feed becoming choked from compressed leaves or other matter.

Another object of the invention is the provision of a device of this character, wherein through an inlet and outlet fluid can pass through the device for filtering and straining purposes to relieve the same during the flow thereof from debris or foreign matter, the device being of novel construction and is automatically operated.

A further object of the invention is the provision of a device of this character, wherein the power unit for the automatic operation will be stopped and started under the influence of the cleaning device so that the entire working of the latter is automatic.

A still further object of the invention is the provision of a device of this character, which is comparatively simple in construction, readily and easily mountable within a fluid conduit for the automatic cleaning of the fluid flowing therethrough, thoroughly reliable and efficient in its operation, strong, durable, and inexpensive to manufacture and install.

With these and other objects in view, the invention consists in the features of construction, combination and arrangement of parts as will be hereinafter more fully described, illustrated in the accompanying drawings, which disclose the preferred embodiment of the invention and pointed out in the claim hereunto appended.

In the accompanying drawings:

Figure 2 is a top plan view.

Figure 3 is a sectional view on the line 3—3 of Figure 1 looking in the direction of the arrows.

Similar reference characters indicate corresponding parts throughout the several views in the drawings.

Figure 1:
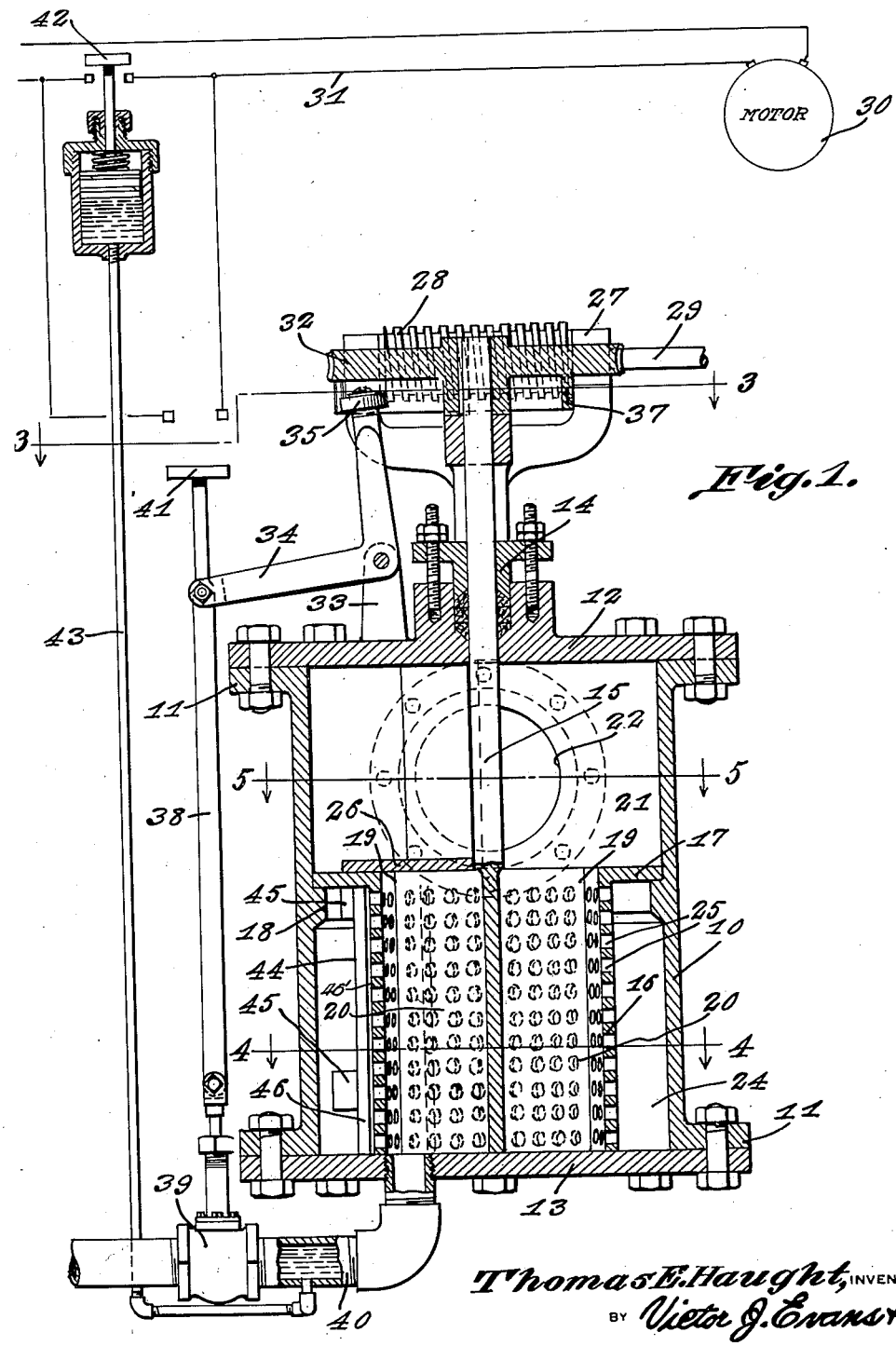
Figure 1 is a vertical sectional view through a device constructed in accordance with the invention and showing diagrammatically the motor support and the switch controls for the support under the influence of said device.
Figure 4:
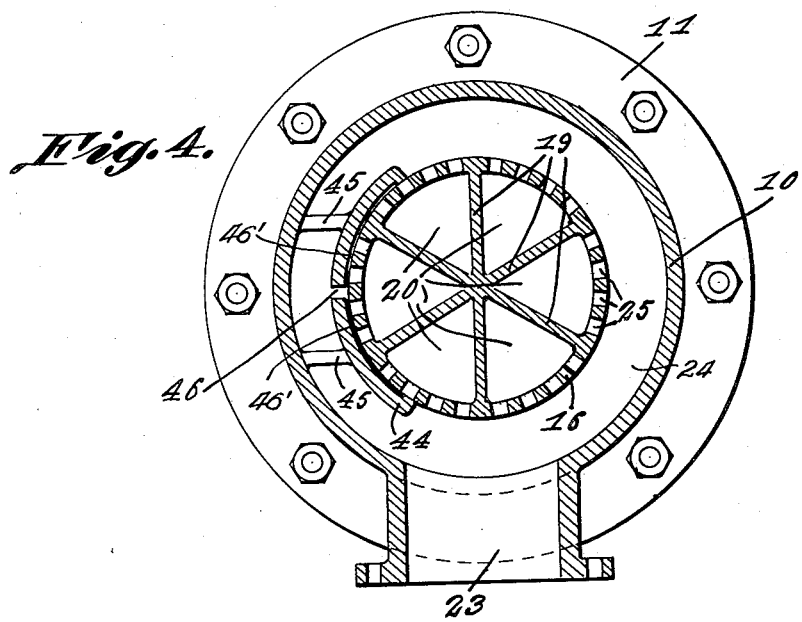
Figure 4 is a sectional view on the line 4—4 of Figure 1 looking in the direction of the arrows.
Figure 5:
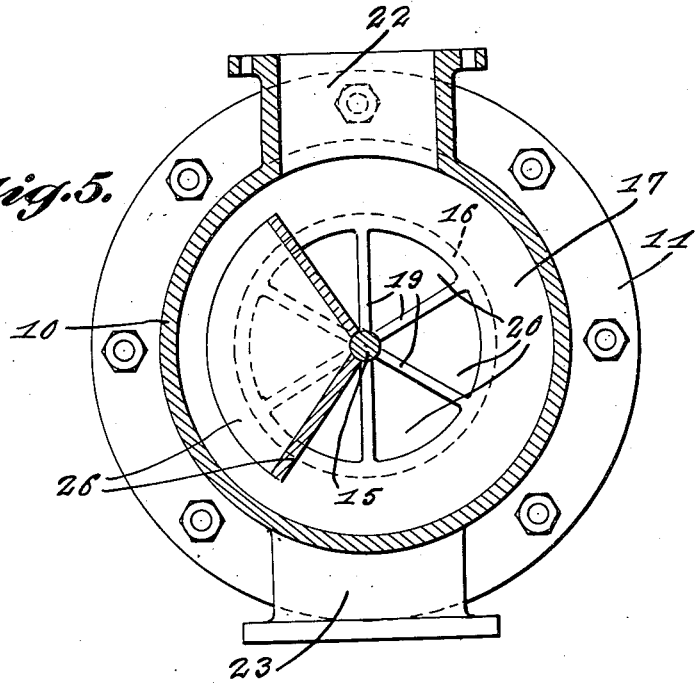
Figure 5 is a sectional view on the line 5—5 of Figure 1 looking in the direction of the arrows.

Referring to the drawings in detail, the device constituting the present invention comprises a cylindrical casing 10 open at opposite ends and having formed at such ends laterally out-turned annular flanges 11 for contact by end heads 12 and 13, respectively. The end head 12 is formed with a stuffing box or a packing gland 14 through which is passed the stem 15 of a reticulated or perforated strainer cylinder 16 which is held centered within the casing 10 by a lateral annular flange 17 formed at the top thereof and engaged upon an annular shoulder or seat 18 formed interiorly of the casing intermediate the ends thereof. Integral with the cylinder 16 is a spider which forms radial walls or partitions 19 within the cylinder 16 to divide the same into a plurality of chambers 20 concentric to the axis of movement of said cylinder and these chambers 20 open through opposite ends of the cylinder. The upper open ends of the chambers 20 communicate with a flow space 21 with which communicates a fluid inlet 22. The inlet 22 is uppermost to an outlet 23 and is above the seat or shoulder 18 for the flange 17 of the cylinder 16. The cylinder 16 is of considerably less diameter than the casing 10 so that when its flange 17 is engaged with the seat 18 there will be a fluid space 24 concentrically of the cylinder between it and the wall of the casing 10 and the outlet 23 leads from the said space 24. This space 24 has communication with the space 21 through the perforations 25 provided in the cylinder 16 in those chambers 20 uncovered at their upper ends. The lower open end of the cylinder is confronted by the lower end head 13 of the casing 10 which serves to close the same while within the flow space and built into the casing 10 is an upper baffle 26 which serves to close a portion of the cylinder 16 at the open upper end thereof. The baffle 26 is fixed or stationarily held in the casing 10.

On the upper head 12 is arranged a bearing 27 for a worm screw 28, its shaft 29 being driven from an electric motor 30 included in an electric power circuit 31. The worm screw 28 meshes with a worm gear 32 fixed to the stem 15 so that when the motor is operating the cylinder 16 will be slowly rotated by reason of the gear ratio between the worm screw and worm gear.

Arranged above the upper end head and suitably supported in a bearing 33 formed therewith is a bell crank or trip lever 34, it on one arm thereof carries a traction wheel 35 cooperating with cams 36 and 37, respectively, built on the under side of the gear 32 so that the bell crank or lever will be automatically shifted for vertical swinging movement. The other arm of the lever 34 is pivoted to an opening and closing valve rod 38 for controlling a gate valve operating within a valve casing 39 fitted in a cleaner pipe 40, the cams 36 and 37 being adapted to alternately open and close the valve within the casing 39 on the turning of the gear 32. The pipe 40 opens through the lower end head 13 for communication with the chambers 20 within the cylinder 16 in single order. Carried by the valve rod 38 is an opening and closing switch 41 included in the circuit 31.

The circuit 31 also includes a fluid pressure switch 42, the fluid lead thereto being indicated at 43 and is tapped into the cleaner pipe 40 between the valve casing 39 and the point of communication of the pipe 40 with the cylinder 16.

At that side of the cylinder 16 having a chamber 20 communicating with the pipe 40 is located an arcuate shaped baffle 44 which is stationarily supported by holding webs 45 joined therewith and with the casing 10. This baffle 44 extends from the lower end head 13 to the flange 17 on the cylinder 16 and is outside of the latter so as to close the perforations 25 next thereto in said cylinder 16. This baffle 44 is formed with a slot 46 which establishes communication between the fluid space 24 and the cylinder 16 only at the chamber 20 in said cylinder communicative with the pipe 40 which is adjacent to said baffle 44.

In the operation of the strainer assume that all of the chambers 20 in the cylinder 16 are clear or free of debris or foreign matter, both of the switches 41 and 42 are open and the motor 30 at a standstill. Under this condition liquid flow exists from the inlet side of the casing 10 to the outlet side thereof. The inlet being indicated at 22 and the outlet at 23. Such flow passes through the chambers 20 excepting that area covered by the baffles 26 and 44 thence through the perforations 25, the space 24 and is discharged at the outlet side of the casing 10. At the same time fluid under pressure from the inlet 22 will pass through the slot 46 in the baffle 44 into the chamber 20 covered by the baffles 26 and 44 so that this fluid pressure will exist in the pipes 40 and 43 thus acting upon the switch 42 to hold the same in an open position. It is, of course, understood at this particular time the valve 39 in the pipe 40 is in closed position and the switch 41 open so that the motor 30 is at a standstill.

Now when leaves or other foreign matter collect within the uncovered chambers 20 in the cylinder 16 to clog the perforations 25 in this cylinder, there will be a drop in the pressure of fluid in pipe 40 and the pipe 43 thus the switch 42 will close the circuit 31 and start the motor 30. The starting of the motor 30 drives the cylinder 16 causing it to turn thus bringing the normally covered chamber 20, which is free of debris or foreign matter, into a position to restore normal pressure within the pipe 43. As the cylinder 16 turns, the gear 32 driven from the motor through the screw 28 simultaneously operates with said cylinder turning the cams 36 and 37, these successively working for the opening and closing of the valve 39 in the pipe 40. The initial turning of the cylinder 16 effects the opening of the valve and it is necessary for the said cylinder 16 to make a complete revolution for the closing of said valve. On the opening of the valve 39 the switch 41 will be closed and normal pressure now existing in pipe 43 the switch 42 will open. Thus the motor will continue to be active or running. During the rotary cycle of the cylinder 16 the respective chambers 20 therein will be cleaned and this is brought about by fluid pressure being admitted through the slot 46 and its clearance 46' when the perforations 25 confront the said slot 46 and the clearance 46' when the said cylinder 16 is moving. The flow of liquid through these perforations 25 from without to within the chamber covered will cause a dislodging of foreign matter and leaves from the said perforations 25 causing such leaves and foreign matter to pass from the covered chamber into pipe 40 and flow away therein. In this instance there are shown six chambers 20 which receive pressure from the inlet side of the strainer and of this series fluid under pressure is admitted to five of these chambers directly to have such fluid pass from within outwardly through the perforations, that is to say, those uncovered, while the remaining other chamber which is covered has the fluid passing from without it to within the same to maintain normal pressure in the pipe 40 and thus holding the switch 42 open while the debris and foreign matter within the covered chamber 20 will be carried therefrom through pipe 40 for discharge with the result that this covered chamber will be cleaned.

What is claimed is:

A strainer of the character described comprising a cylindrical casing closed at its opposite ends and having an inlet and outlet in different planes with respect to each other, a reticulated cylindrical strainer rotatably mounted within the cylindrical casing between the inlet and outlet, said strainer being spaced from the casing to provide an annular chamber therebetween, a flange extending outwardly from the upper portion of the strainer and contacting the casing for closing the said annular space from communication with the inlet, radially arranged partitions within the strainer for dividing the same into a plurality of chambers, a stationary cover member mounted on top of the strainer, said cover member being constructed and arranged to successively close the top of each individual chamber as the strainer is rotated, a baffle located in said annular space and having a slot for establishing communication between the said annular space and the chamber of the strainer which is covered, said baffle being located in close proximity to the strainer and in conjunction with the said cover member completely closing off the said covered chamber from communication with the inlet, a discharge pipe leading from the cylindrical casing and communicating only with the chamber which is covered, driving means connected with said strainer for rotating the same, an electric motor operating said driving means and included in an electric circuit, a pressure switch within said circuit, means communicating the pressure switch with the discharge pipe whereby said pressure switch is operated by the pressure in said discharge pipe, a valve in said discharge pipe, means operatively connected with said motor and said driving means for opening said valve during a cleaning operation and closing it upon completion of the same, a switch in said electric circuit arranged in parallel with said pressure switch, and means operatively connecting said switch and valve whereby the switch is maintained in closed position when the valve is opened and in open position when the valve is closed.

THOMAS E. HAUGHT.